United States Patent [19]

Williams

[11] 4,237,769
[45] Dec. 9, 1980

[54] RELIEF VALVES AND MINE PROPS INCORPORATING THE SAME

[75] Inventor: Arthur J. Williams, Youngstown, Ohio

[73] Assignee: Commercial Shearing, Inc., Youngstown, Ohio

[21] Appl. No.: 892,914

[22] Filed: Apr. 3, 1978

[51] Int. Cl.³ .................. F01B 31/12; F15B 13/04; F16K 37/00
[52] U.S. Cl. ............................ 91/1; 91/454; 137/596.2; 137/557; 248/354 H; 251/43
[58] Field of Search .................. 91/454, 461, 1; 248/354 H; 137/881, 491, 492.5, 495, 557, 596.2; 251/43, 44

[56] References Cited

U.S. PATENT DOCUMENTS

| | | | |
|---|---|---|---|
| 1,593,648 | 7/1926 | Berger | 137/495 X |
| 1,660,382 | 2/1928 | Hopkins | 137/491 |
| 1,949,150 | 2/1934 | Eplett | 137/491 X |
| 2,477,496 | 7/1949 | Russell | 137/495 X |
| 2,621,631 | 12/1952 | Dowty | 248/354 H |
| 3,164,166 | 1/1965 | Tennis | 137/491 |
| 3,197,168 | 7/1965 | Cowlishaw | 248/354 H |
| 3,212,523 | 10/1965 | Martin | 137/491 X |
| 3,699,991 | 10/1972 | Munch | 137/557 X |
| 3,820,444 | 6/1974 | Ward | 91/461 X |

FOREIGN PATENT DOCUMENTS 1131625  6/1962  Fed. Rep. of Germany ...... 248/354 H

Primary Examiner—Irwin C. Cohen
Attorney, Agent, or Firm—Buell, Blenko, Ziesenheim & Beck

[57] ABSTRACT

A relief valve assembly particularly in combination with yieldable pit posts is provided having an elongate housing, a first load chamber at one end of said housing, an inlet aperture into said housing, a non-return valve in said inlet aperture for admitting fluid non-returnably into said load chamber, a first valve seat in said housing communicating with said load chamber, a spring loaded relief valve movable lengthwise of the housing and normally engaging said seat to close the load chamber, a second valve seat in said housing spaced lengthwise from said first valve seat and relief valve and forming therebetween a balancing load chamber, a spring loaded pilot relief valve movable lengthwise of the housing and normally engaging said second seat to close the same, and a regulated orifice means in said relief valve connecting the first load chamber and the balancing load chamber whereby said balancing load chamber is normally pressurized to the pressure of the load chamber.

2 Claims, 10 Drawing Figures

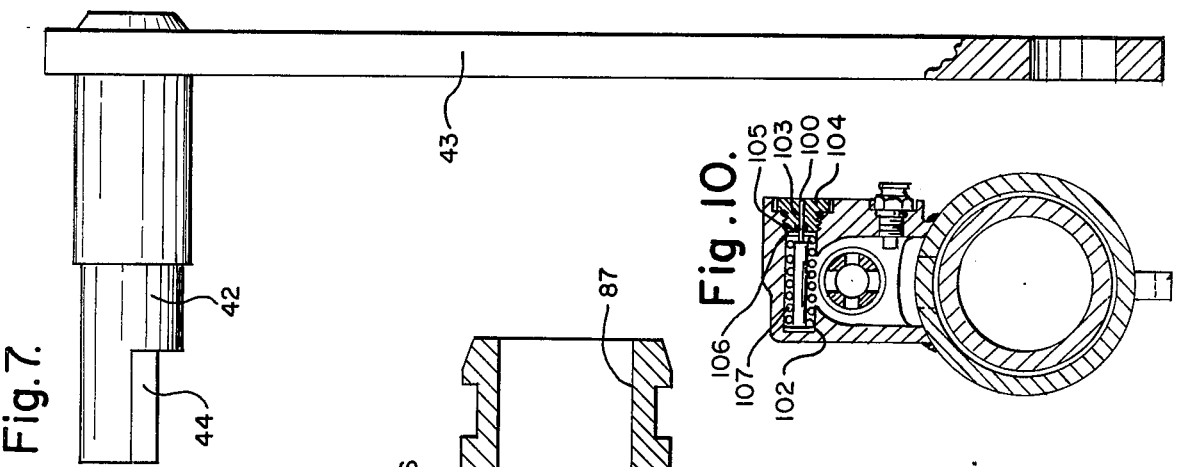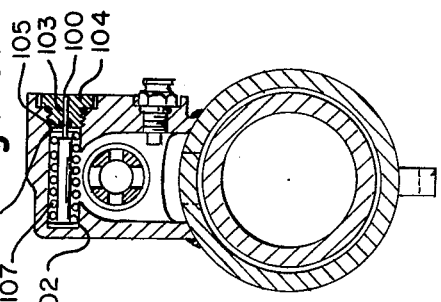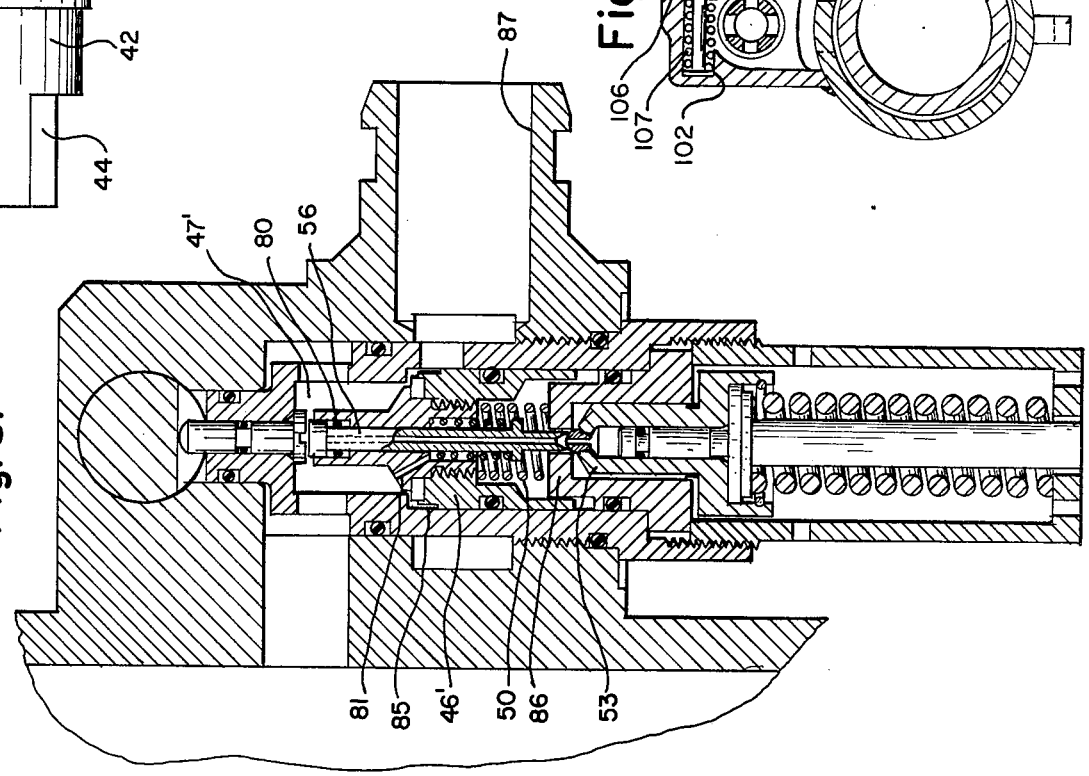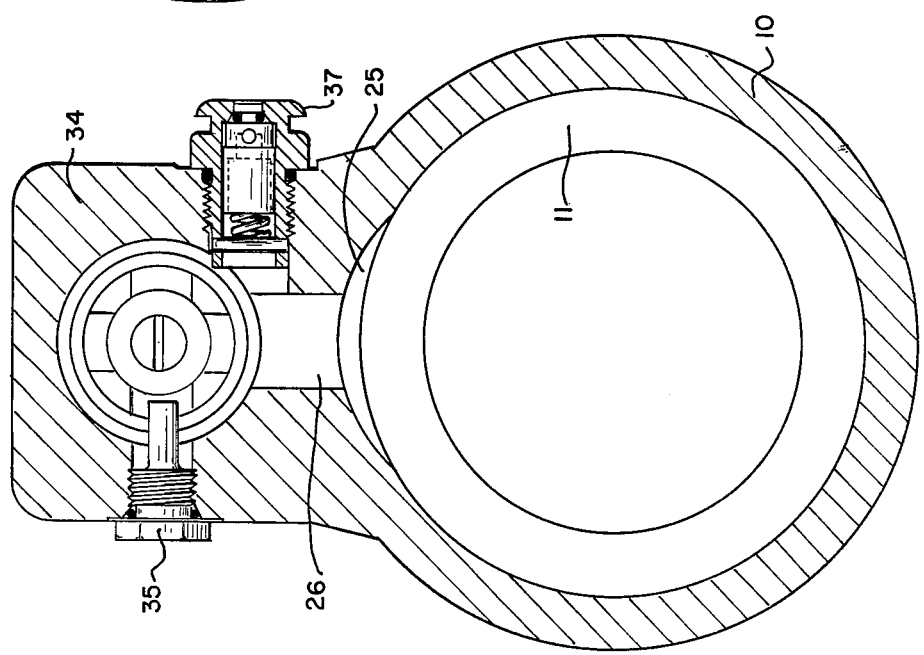

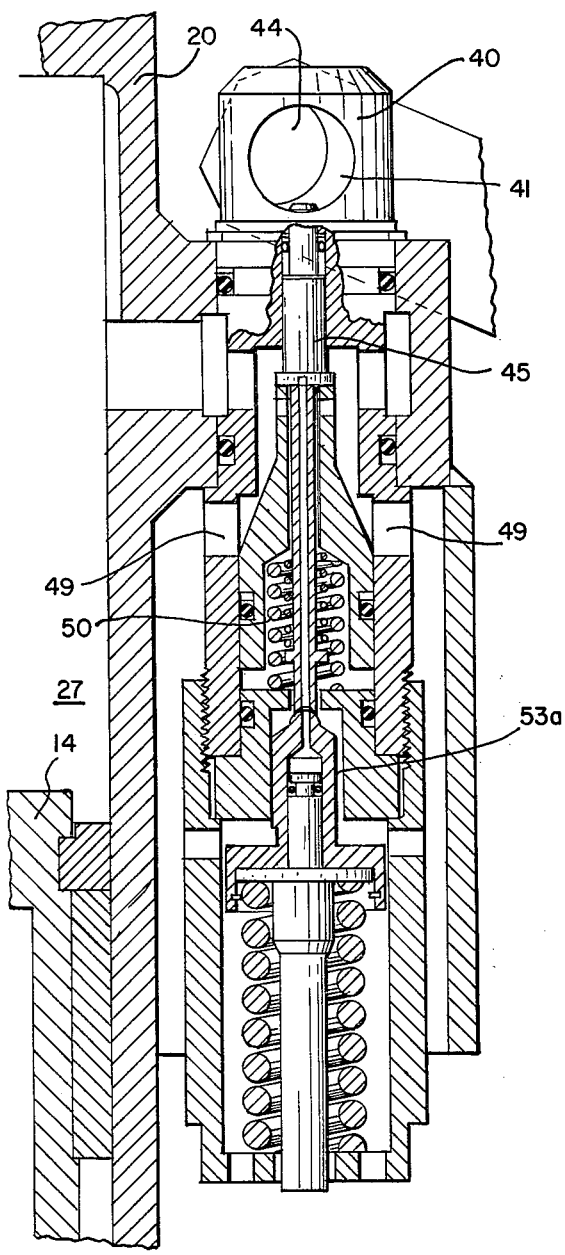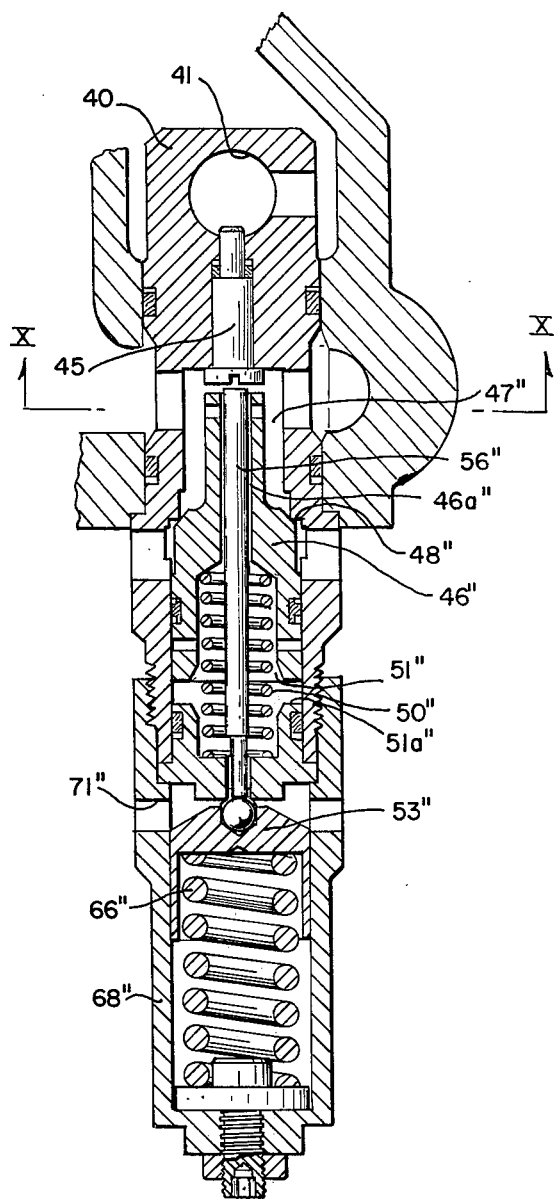

RELIEF VALVES AND MINE PROPS INCORPORATING THE SAME

This invention relates to relief valves and mine props and particularly to yieldable mine props used in underground mining operations to support a hanging roof.

Sudden increases on the loading of a mine prop as a result of movement of the roof will, if the prop is rigid, result either in the collapse of the prop or penetration of the roof or bottom by the ends of the prop. Accordingly, it is essential that yieldable mine props yield very quickly, however, it is equally important that the prop not collapse but maintain constant contact and constant substantially uniform support with the hanging roof.

Relief valves designed for slow yielding have been used with hydraulically operated telescoping mine props, however, experience has shown that these do not yield rapidly enough. The present invention provides a mine prop and relief valve assembly which will act sufficiently rapidly, both in opening and closing, to provide the necessary substantially constant support for the moving roof.

Preferably I provide an hydraulically operated mine prop comprising inner and outer telescoping members sealing slidable, one within the other, a relief valve housing mounted on the outer of said telescoping members communicating through the wall of said telescoping member to an area between said inner and outer members, a double seat pilot operated relief valve within said relief valve housing, loading means for preloading said relief valve to a selected load and means adapted for selectively manual opening of the relief valve. Preferably, indicator means are provided regulated by the loading of the pilot operated valve indicating the amount of pre-load applied to the pilot operated valve. The relief valve preferably includes a large aperture relief valve poppet having an inlet aperture connected to a chamber housing an indicator plunger and a slidable rod means adapted manually to unseat the relief valve poppets. The relief valve of this invention, while particularly suited to mine props may also be used in any fluid pressure system, e.g. spool or poppet type control valve assemblies.

In the foregoing general description of this invention I have set out certain objects, purposes and advantages of the invention. Other objects, purposes and advantages of the invention will be apparent from a consideration of the following description and the accompanying drawings in which:

FIG. 5 is a section on the line V—V of FIG. 3;

FIG. 6 is a view similar to FIG. 3 showing the manual release handle in position;

FIG. 7 is a side elevational view of the manual release handle shown in FIG. 6;

FIG. 8 is a second embodiment of relief valve according to this invention;

FIG. 9 is a section through a third embodiment of this invention; and

FIG. 10 is a section on the line X—X of FIG. 9.

Figure 1:
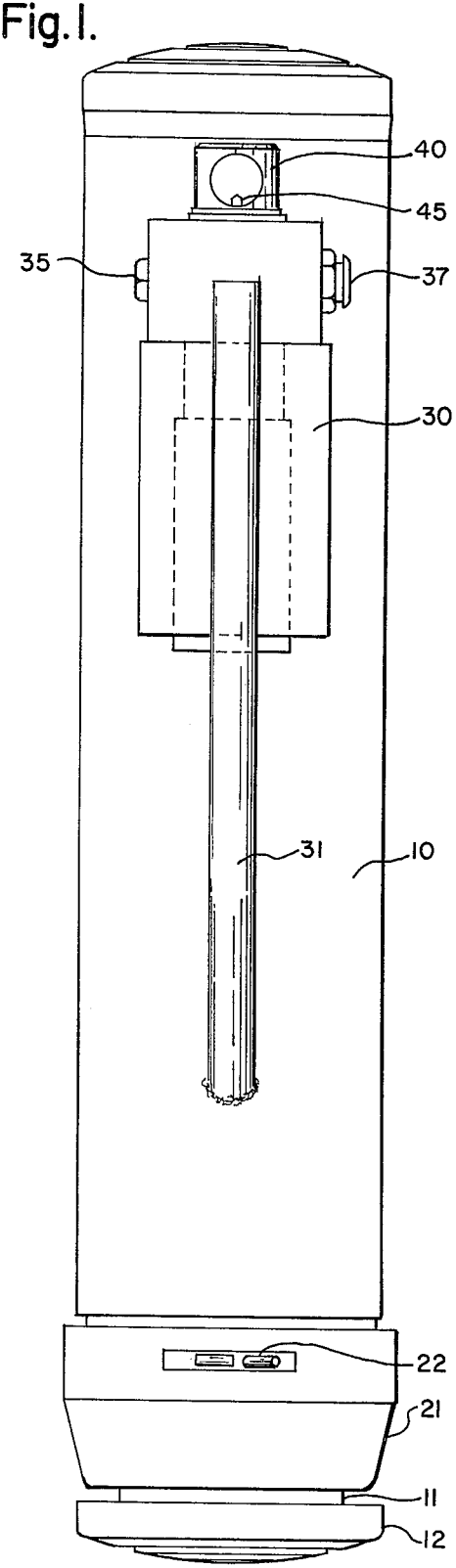
FIG. 1 is a side elevational view of a mine prop according to this invention.

Referring to the drawings I have illustrated an outer cylindrical member 10 and an inner cylindrical member 11 forming a telescoping mine prop. The inner member carries at its outer end a foot pad 12 held by retainer pins 13. The other end, within outer member 10, is closed by a cap 14 welded in place and adjacent said other end in slot 15 is provided a guide lock retainer ring 16 which holds bearing 17 and chevron packing 18 against shoulder 19 spaced from said inner end. The outer member 10 rides on said bearing 17 and packing 18 and is closed by roof pad 20 at one end. The other end is provided with a sealing gland 21 held by a wire retainer 22 and carrying a wiper and bearing ring 23 in groove 24. The wiper and bearing ring 23 slidably engages the outer surface of inner cylindrical member 11. An inlet slot 25 in the inner wall of the outer cylindrical member 10 adjacent the roof pad 20 connects a radial passage 26 through the wall of the outer cylindrical member 10 with the area 27 between the two cylindrical members 10 and 11. A relief valve 30 is fixed on the exterior wall of the outer member 11 in communication with radial passage 26 and is covered by a protecting arm 31. The relief valve 30 has an outer housing made up of an upper cartridge holder portion 32 and a lower larger inner diameter shell portion 33. A dual relief valve cartridge 34 is inserted into holder portion 32 and positioned by cartridge alignment plug 35. The cartridge 34 has a through passage 36 which connects with radial passage 26. A fluid inlet check 37 on the side of housing 30 communicates with passage 26 between cartridge 34 and slot 25 and is used for charging the assembly with fluid when placed in position. The relief valve cartridge 30 has a head portion 40 which extends out of housing 30 and is provided with a cylindrical opening 41 therethrough adapted to receive cam head 42 on a manual release handle 43. The cam head 42 is inserted into opening 41 in head 40 with cam 44 above relief valve release plunger 45 which extends into opening 41. By rotating handle 43 cam 44 depresses plunger 45 and manually releases relief valve member 46 in relief valve cartridge 34 in a manner more fully described hereafter. This permits fluid to flow from area 27 between inner 11 and outer members 10 through passage 26 into chamber 47 in relief valve cartridge 34 above relief valve member 46 and through the now open area between the valve seat 48 and the depressed relief valve member 46, out openings 49 to vent between shell 30 and the lower end of valve cartridge 34. The relief valve member 46 is normally urged into sealing contact with valve seat 48 by a spring 50 in a well 51 in valve member 46. Spring 50 bears against a stop member 51a intermediate the body of valve cartridge 34.

The stop member 51a is provided with an axial passage 52, coaxial with a passage 46a in valve member 46. The bottom side of passage 52 provides a seat for pilot relief valve 53 which has an axial passage 54 in alignment with axial passage 55 in pilot tube 56 which extends through passage 46a from chamber 47 and has a concial seat 57 which bears on the head of pilot relief valve 53. Pilot tube 56 has an annular radial flange 58 in well 51 on which one end of a spring 59 bears. The other end of spring 59 bears against the top of well 51 in valve member 46, and thus urges pilot tube 56 against the end of pilot relief valve 53. Passage 46a is slightly larger than pilot tube 56 and the area between provides a regulated orifice passage for fluid into well 51. Pilot relief valve 53 has a central axial well 60 within which piston 61 moves. Piston 61 is fixed on a base plate 62 on indicator rod 63. Base plate 62 is mounted in a recess 64 on the base of pilot relief valve 53 for limited movement between retainer ring 65 and the top of recess 64. A spring 66 bears at one end on base plate 62 and at the other end on flange 67 forming the base of the bottom cover 68 of the pilot relief valve assembly. Indicator rod 63 extends through an opening 69 in flange 67 and is surrounded by passages 70 for discharge of fluid.

In operation the prop assembly is placed in position and charged with fluid through fluid inlet check 37 to move the upper 10 and lower 11 cylinders apart into supporting relationship with the desired amount of pressure. At the same time axial well 60 is pressurized forcing indicator rod 63 out of opening 69 to provide an indication of the level of pressurization. If it is desired to relieve the pressure manually, as for example, if a prop is to be moved, the cam 44 is inserted into opening 41 in head 40 and rotated so as to depress relief valve release plunger 45. This is turn depresses pilot tube 56 and pilot relief valve 53 away from its seat at passage 52, permitting fluid to escape from well 51 and from chamber 47 through the area between passage 46a and tube 56 through passage 52 around valve 53, through slot 53a in valve 52 and out passages 71 and 70 in the bottom cover 68. This will in turn cause main relief valve 46 to open permitting fluid to flow out through passages 49 as described above.

When the prop is in position and it becomes overloaded, the relief valve will slowly release fluid as a result of the increased pressure on pilot tube 56 and on relief valve 53 causing relief valve 53 to unseat and permit fluid to pass from chamber 47 through the area between passage 46a and pilot tube 56, through opening 52, slot 53a and out passages 70 and 71 in base cover 68. In the event of a sudden drastic overload requiring rapid yield, the foregoing actions will take place and at the same time main relief valve 46 will be unseated and fluid will flow through passage 49 as well as through passages 70 and 71 of the relief valve housing.

Figure 2:
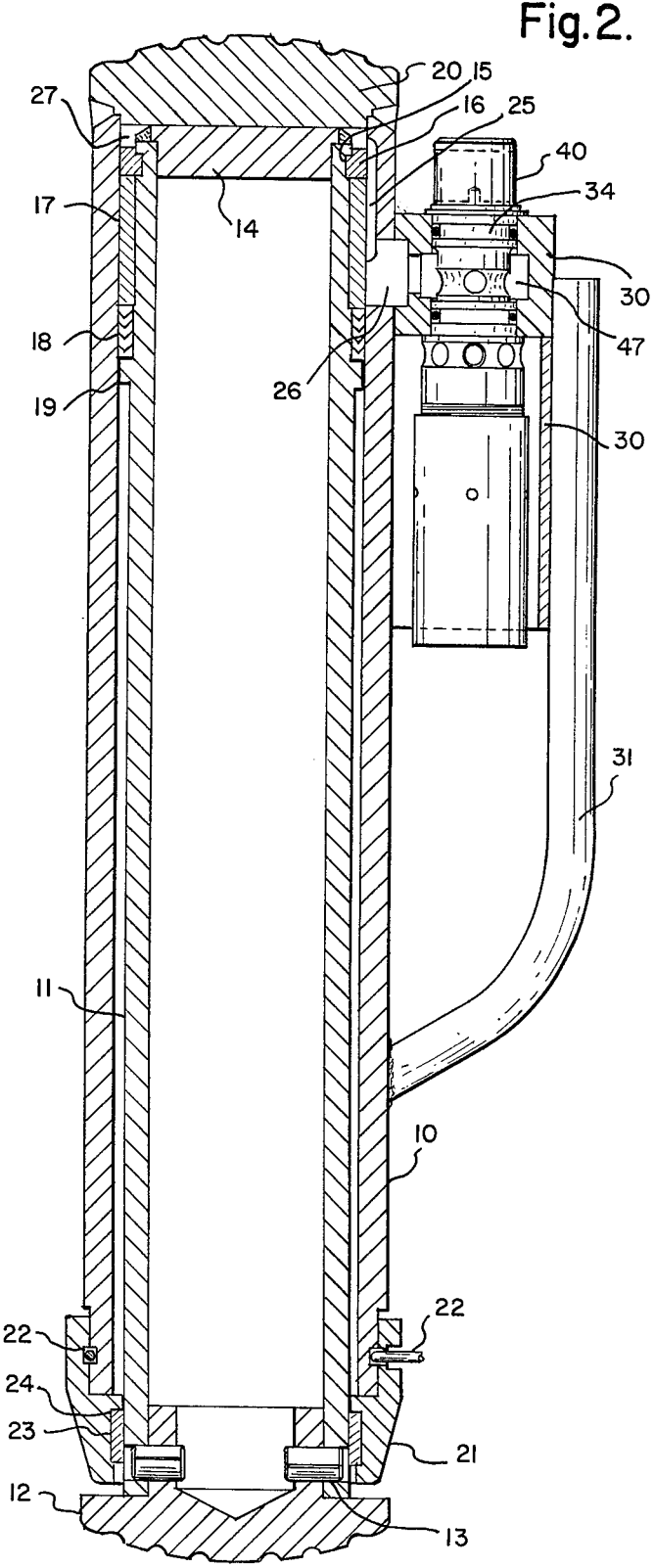
FIG. 2 is a vertical section on the line II—II of FIG. 1 with the relief valve partly in section.
Figure 3:
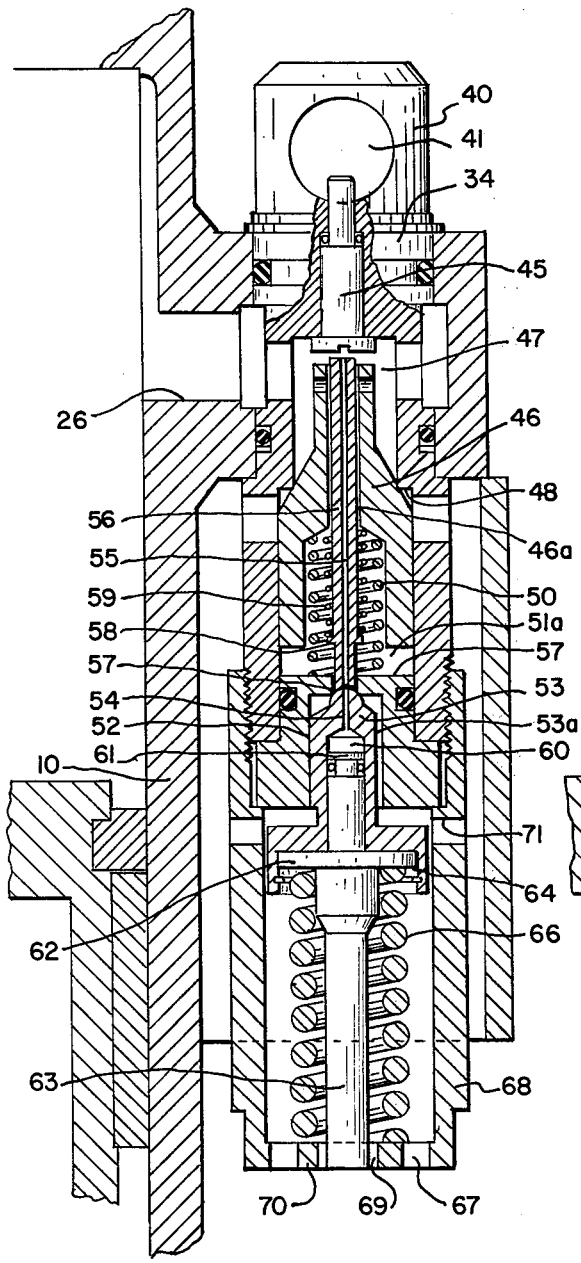
FIG. 3 is an enlarged fragmentary section on the line II—II of FIG. 1 showing the relief valve in closed position.
Figure 4:
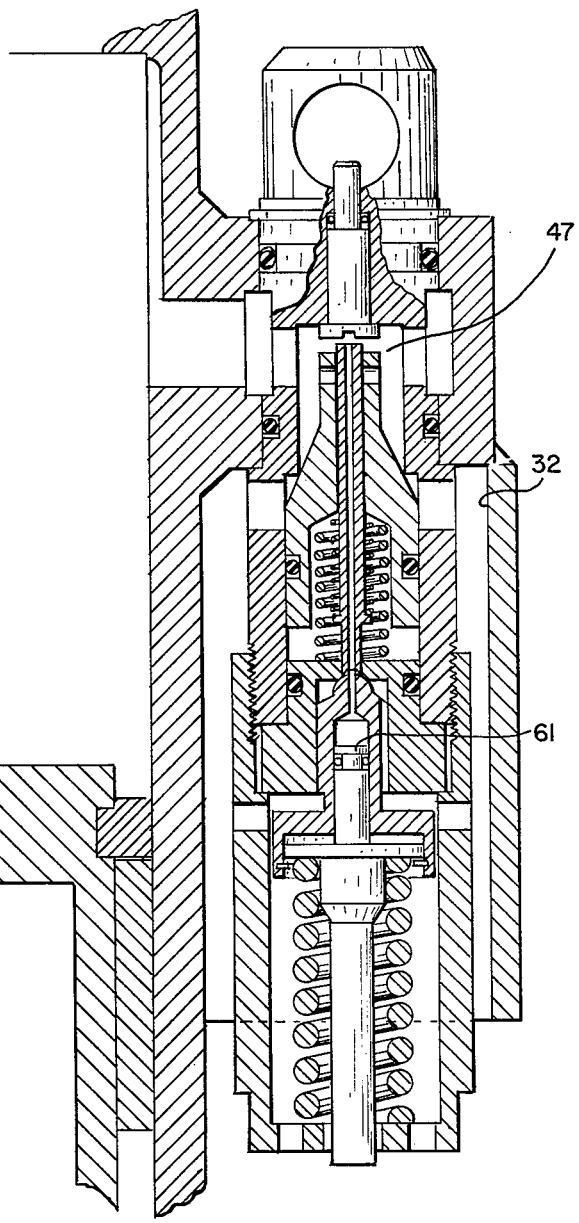
FIG. 4 is a view identical with that of FIG. 3 with the relief valve closed and preloaded with the pressure indicator extended to show the amount of preload.

In FIG. 8 I have illustrated a second embodiment of my invention in which like parts are given like numbers with a prime sign. In this embodiment the pilot tube 56' is sealed by an O-ring 80 and a separate regulated orifice passage 81 is provided to deliver fluid from chamber 47' into well 51' to act on pilot valve 53' as in the embodiment of FIGS. 1-7. In addition relief valve 46' is made in two parts, an upper head 46a' and a base 46b' adapted to carry between them a replaceable seat 85. Valve 46' acts both as a relief valve and as an input check valve, thus replacing check valve 37 of the form shown in FIGS. 1-7. In this case fluid is introduced through input port 87 and acts on the exposed shoulders of valve 46' to overcome spring 50'. The head 86 of pilot relief valve 53' may also be replaceable.

The operation of the embodiment of FIG. 8 is essentially the same as that of FIGS. 1-7.

In FIGS. 9 and 10 I have illustrated a third embodiment of my invention which is somewhat simpler and less expensive to construct. In the drawings like parts are given numbers corresponding to those of FIGS. 1 through 7 with a double prime sign. There are, in effect, two major areas of difference between the embodiment of FIGS. 9 and 10 and that of FIGS. 1 through 7. First, the indicator rod 63 is removed from the bottom end of the valve and a different form of indicator rod 100 is placed in a separate bore 101 in housing 32" at the side of and generally transverse to the axis of the valve. In this modification, the indicator rod includes a piston 102 with rod 100 extending through opening 103 in cap 104 in the end of bore 101. An O-ring seal 105 surrounds rod 100 in bore 103 and is held in place by retainer ring 106 and spring 107. The second significant difference is that pilot rod 56" is solid rather than hollow and does not have spring 59, shoulder 58 and hole 55 that appear in the embodiment of FIGS. 1-7. This provides somewhat less expensive valve assembly which generally accomplishes the same result.

In the foregoing specification I have set out certain presently preferred practices and embodiments of my invention, however, it will be understood that this invention may be otherwise embodied within the scope of the following claims.

I claim:

1. A relief valve assembly comprising an elongate housing, a first load chamber at one end of said housing, an inlet aperture into said housing, a non-return valve in said inlet aperture for admitting fluid non-returnably into said load chamber, a first valve seat in said housing communicating with said load chamber, a spring loaded relief valve movable lengthwise of the housing and normally engaging said seat to close the load chamber, a second valve seat in said housing spaced lengthwise from said first valve seat and relief valve and forming therebetween a balancing load chamber, a spring loaded pilot relief valve movable lengthwise of the housing and normally engaging said second seat to close the same, a regulated orifice means in said relief valve connecting the first load chamber and the balancing load chamber whereby said balancing load chamber is normally pressurized to the pressures of the load chamber, wherein the regulated orifice means in the relief valve is formed between an axially extending passage through the relief valve and a slidable solid plunger of smaller diameter than the passage resting on the head of the pilot relief valve and movable in said axial passage, said plunger extending from said axial passage beyond the end of said relief valve, manual release means mounted adjacent the extending end of the plunger for engaging same to move said pilot valve to its open position to vent the valve assembly, and indicator means visible from the exterior of the housing mounted in a bore generally transverse to the axis of the valve assembly and communicating with the load chamber whereby fluid pressure in the load chamber urges the indicator means outwardly of the bore and resilient means in the bore normally urging the indicator into the bore against fluid pressure therein.

2. A valve assembly as claimed in claim 1 wherein the load chamber is connected to a hydraulic expansible chamber pit post.

* * * * *